2,850,542
Patented Sept. 2, 1958

2,850,542

METHOD OF PREPARING p-XYLYLENE DICHLORIDE

Erwin Heisenberg, Erlenbach, Main, and Rudolf Lotz, Klingenberg, Main, Germany, assignors to Vereinigte Glanzstoff-Fabriken Aktiengesellschaft, Wuppertal Elberfeld, Germany, a German joint-stock company No Drawing. Application June 25, 1954
Serial No. 439,481

Claims priority, application Germany June 25, 1953

5 Claims. (Cl. 260—651)

This invention relates to a method of preparing p-xylylene dichloride from benzene, hydrochloric acid gas and formaldehyde or substances splitting off formaldehyde in the presence of inert dispersing agents and catalysts.

It is well known that in the chloromethylation of benzene, also a comparatively small quantity of p-xylylene dichloride is formed. When a calculated amount of benzene is caused to act on trioxymethylene in an inert dispersing agent and in the presence of zinc chloride while simultaneously a strong current of hydrochloric acid gas is introduced, there is formed, apart from the benzyl chloride which is recovered as the principal product, also p-xylyene dichloride at a yield of about 30%.

We have now found that p-xylylene dichloride is obtained in great purity and in large yield, if during the reaction of benzene, hydrochloric acid gas and formaldehyde or substances splitting off formaldehyde, in the presence of inert dispersing agents and catalysts certain steps are taken which impede the formation of benzyl chloride while promoting a preponderant formation of p-xylylene dichloride.

These steps are based on the following reasoning: The prior process has been found to involve the material drawback that if merely zinc chloride is present as a catalyst, certain secondary reactions take place; thus, for example, diphenyl methane or other undesirable condensation products are formed.

According to this invention the influence exerted by the zinc chloride as a Friedel-Crafts reagent is directed in such manner that side reactions are substantially impeded and the formation of p-xylylene dichloride is materially promoted. The present invention contemplates achieving this important result, by replacing a certain percentage, e. g. 10 to 20%, of the zinc chloride catalyst by a dehydrating agent such as e. g. boron phosphate or boron trioxide.

We have further found that in order to obtain the best possible results according to this invention, it is important to correctly select the point of time when the benzene is added to the reaction mixture. If formaldehyde and hydrochloric acid gas are allowed to act immediately on the benzene, benzyl chloride will result as the main product while p-xylylene dichloride will only form as a by-product. However, if first hydrochloric acid gas is passed into a suspension of formaldehyde or a substance capable of splitting off formaldehyde, such as formaldehyde, in the presence of an inert dispersing agent such as carbon tetrachloride until the suspension has become limpid, the mixture of hydrochloric acid gas and formaldehyde is present in the suspension in a particularly active form. If, once this condition prevails, benzene is introduced into the suspension dropwise and during a predetermined period of time, the reaction will proceed continuously.

We have further found that during the reaction an aqueous layer separates out underneath the reaction mixture, which layer would interfere with a complete conversion of the reaction products into the p-xylylene dichloride. This aqueous component is formed in the course of the reaction. According to the invention, when the reaction has been progressing for about 2–3 hours, this aqueous layer is removed. The reaction mixture which now contains a higher percentage of p-xylylene dichloride, is treated once more with hydrochloric acid gas or with concentrated hydrochloric acid, zinc chloride and boron phosphate are added if desired, and inert dispersing agent is also added to the reaction mixture if necessary.

After another separation of the aqueous reaction component which has been formed, the p-xylylene dichloride in the upper layer increases so as to form about 70% calculated on the starting quantities of the reaction components. The p-xylylene dichloride now can be recovered from the solution by crystallization, while the mother liquor can be used again in the next reaction.

According to the above outline of the steps to be taken in accordance with this invention, (1) A dehydrating agent, such as crystallized boron phosphate or boron trioxide is used in addition to the zinc chloride which acts as Friedel-Crafts catalyst.

(2) Hydrochloric acid gas is introduced into a suspension of e. g. formaldehyde or paraformaldehyde and an inert dispersing agent until a limpid suspension has formed; only thereafter benzene is added, dropwise.

(3) The aqueous bottom layer which has formed, is separated after a reaction period of about 2–3 hours and a dispersing agent and dehydrating agents are added if necessary or desired, accompanied by introduction of hydrochloric acid gas or concentrated hydrochloric acid.

The formaldehyde may be added in the form of a 35% aqueous solution, but more favorable results are obtained if solid paraformaldehyde is added to the suspension. Zinc chloride and boron phosphate or boron trioxide can be added to the reaction mixture at a ratio of about 90:10 up to 30:70, and preferably 50:50.

The process according to this invention may, for example, proceed as follows.

Example

Into a suspension of 400 cc. carbon tetrachloride, in which are contained 120 g. paraformaldehyde, 50 g. zinc chloride and 50 g. boron phosphate, a vigorous current of hydrochloric acid gas is introduced until an entirely limpid suspension has been formed. This reaction may come to an end after 2 or 3 hours. The mixture is now cooled and 78 g. benzene are added dropwise during about ½ hour while stirring, whereafter the stirring is continued for another half hour. In the course of this reaction, an aqueous layer is formed at the bottom which is removed. This layer in the main contains zinc chloride and boron phosphate, which can be recovered. From the upper reaction layer samples can be taken from time to time in order to control the yield. To the remaining reaction mixture, 12.5 g. zinc chloride, 12.5 g. boron phosphate and 100 cc. carbon tetrachloride are added as well as about 10 cc. concentrated hydrochloric acid. Alternatively a vigorous current of hydrochloric acid gas may be passed through the suspension. After the reaction has progressed for about one hour, the aqueous layer which has again formed is removed and the process repeated as before. If water should continue to separate out, it should be removed again. The p-xylylene dichloride contained in the upper layer is caused to crystallize by cooling. The yield of p-xylylene dichloride thus recovered is about 70% calculated on the quantity of the starting products. The mother liquor can be used for another reaction.

In a comparative test 84 g. anhydrous zinc chloride and 90 g. paraformaldehyde were covered in a three-neck flask of 1 liter, provided with a gas-introduction tube, with 200 cc. carbon tetrachloride. Benzene was then added at once in a quantity of 78 g., equal to 1 mol, and under stirring a vigorous current of hydrochloric acid gas was passed through the flask. The reaction mixture, which had become heated, was first cooled for some time with ice water, and then gradually heated to 50–60° C. The reaction came to an end after about 2 hours. On working up the mixture in a well known manner, about 45% benzyl chloride were obtained as the main product besides about 30% p-xylylene dichloride.

This latter test shows that according to the present method we found, a considerably higher yield, up to 70%, can be obtained.

Various changes may be made in the steps described in the foregoing specification without departing from the invention or sacrificing the advantages thereof.

We claim:

1. The method of preparing p-xylylene dichloride which comprises preparing a suspension of a substance selected from the class constituted by formaldehyde and substances capable of splitting off formaldehyde, in carbon tetrachloride, adding zinc chloride and a dehydrating agent selected from the class of boron phosphate and boron trioxide, thereafter introducing hydrochloric acid gas into this suspension until the said suspension becomes limpid, thereafter introducing dropwise benzene into said suspension, separating the water of reaction formed, introducing a substance selected from the class constituted by hydrochloric acid gas and concentrated hydrochloric acid, into the reaction mixture, and recovering the p-xylylene dichloride thus obtained.

2. The method according to claim 1, wherein the second introduction of the hydrochloric acid component is accompanied by an addition of carbon tetrachloride.

3. The method according to claim 1, wherein the second introduction of the hydrochloric acid component is accompanied by an addition of zinc chloride.

4. The method according to claim 1, wherein the second introduction of the hydrochloric acid component is accompanied by an addition of dehydrating agent.

5. The method according to claim 1, wherein the second introduction of hydrochloric acid component is followed by another removal of water collected, during the reaction, in a bottom layer.

References Cited in the file of this patent

FOREIGN PATENTS 845,503     Germany _____ July 31, 1952